(12) United States Patent
Nakamura et al.

(10) Patent No.: US 8,118,558 B2
(45) Date of Patent: Feb. 21, 2012

(54) RUNNER VANE FOR AXIAL-FLOW HYDRAULIC MACHINERY

(75) Inventors: Kazuyuki Nakamura, Yokohama (JP); Norio Ohtake, Yokohama (JP); Sakito Anpuku, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 12/421,910

(22) Filed: Apr. 10, 2009

(65) Prior Publication Data
US 2009/0257879 A1 Oct. 15, 2009

(30) Foreign Application Priority Data

Apr. 11, 2008 (JP) ................. 2008-103858

(51) Int. Cl.
*B63H 1/26* (2006.01)
*B63H 7/02* (2006.01)
*B21K 25/00* (2006.01)
*B23P 15/04* (2006.01)

(52) U.S. Cl. ................. 416/223 R; 416/243; 29/889.21

(58) Field of Classification Search ............. 416/223 A, 416/223 R, 243; 29/889.21
See application file for complete search history.

(56) References Cited

U.S. PATENT DOCUMENTS

2005/0223708 A1* 10/2005 Kishibe et al. ............... 60/726

FOREIGN PATENT DOCUMENTS

JP 61-76170 5/1986
JP 2007-291874 11/2007

OTHER PUBLICATIONS

Office Action issued Dec. 2, 2010, in Chinese Patent Application No. 200910134820.9 (with English translation).

* cited by examiner

*Primary Examiner* — Michelle Estrada
(74) *Attorney, Agent, or Firm* — Oblon, Spivak, McClelland, Maier & Neustadt, L.L.P.

(57) ABSTRACT

A camber line in a radial section of a runner vane has a curved part extending near the tip of the runner vane is convex toward the front surface of the runner vane. The runner vane is formed in a shape meeting a condition expressed by: $\rho s < \rho p$, where $\rho s$ is the radius of curvature of the back surface of the runner vane and $\rho p$ is the radius of curvature of the front surface of the runner vane. The runner vane of this shape suppresses flows toward the tip thereof to moderate the variation of flow velocity in the turning direction. Consequently, loss can be reduced without impeding the recover of pressure in a draft tube.

6 Claims, 13 Drawing Sheets

RUNNER VANE FOR AXIAL-FLOW HYDRAULIC MACHINERY

BACKGROUND OF THE INVENTION

1. Field of the Invention

The present invention relates to a runner vane for axial-flow hydraulic machinery and, more specifically, to techniques that improve its performance by optimizing the shape of a runner vane.

2. Description of the Related Art

Figure 14:
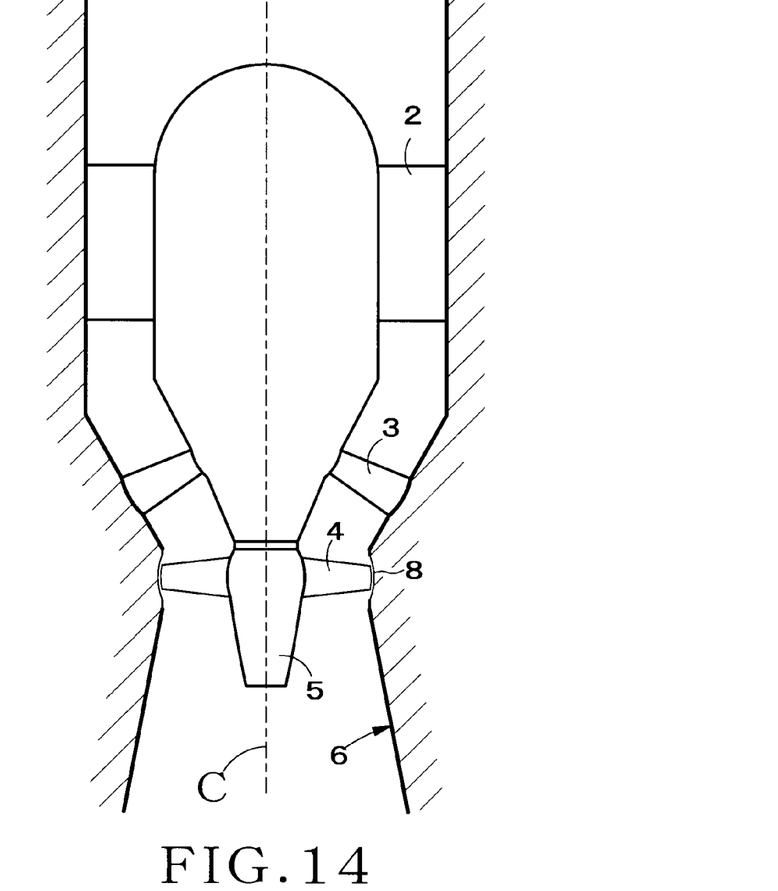
FIG. 14 is a fragmentary sectional view of an axial-flow hydraulic machine.

Kaplan turbines and bulb turbines are known axial-flow hydraulic machines. FIG. 14 shows an essential part of a hydroelectric power station equipped with an axial-flow hydraulic turbine in a sectional view. Referring to FIG. 14, running water flows downstream into a casing 1. Then, the running water flows through stays 2 and movable guide vanes 3 for regulating the flow rate of the running water to a runner provided with runner vanes 4 and connected to a generator by a main shaft.

The running water exerts force on the runner vanes 4 to rotate a boss 5 holding the runner vanes 4. Consequently, the generator is driven to generate electric power. The running water flows through the runner vanes 4 into a draft tube 6. Then, the running water flows downstream or is discharged into a lower reservoir through the draft tube 6.

Figure 15:
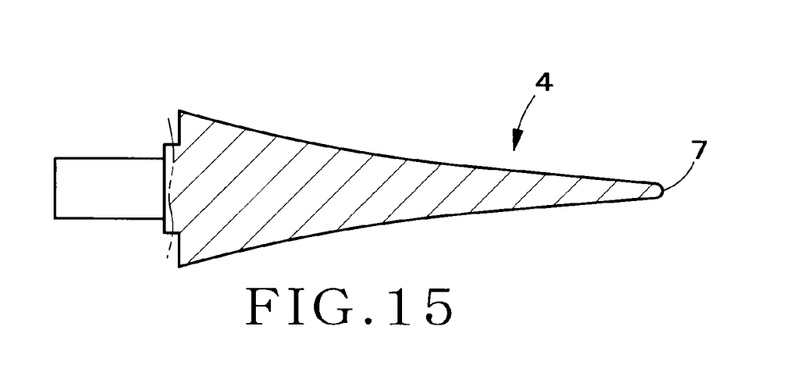
FIG. 15 is a sectional view of a known runner vane.

FIG. 15 shows the runner vane. Since a gap is formed between the tip 7 of the runner vane 4 and a discharge ring 8, the running water flows as a leakage flow through the gap. When the amount of the leakage flow is large, the hydraulic force of the running water cannot be fully imparted to the runner vanes 4 and the loss increases.

When the runner vanes 4 do not overlap each other in a section perpendicular to the axis "C" of the runner, the running water flows as a through flow in a circumferential space where the velocity of the running water is particularly high, namely, a space in the vicinity of the tips 7 of the runner vanes 4, without acting on the runner vanes 4.

Distribution of flow velocity is liable to be disturbed at the trailing edge of the runner vanes 4 in the vicinity of the tips 7 by the through flow of the running water and the gap between the runner vanes 4 and the discharge ring 8. The pressure of the disturbed flow cannot be satisfactorily recovered in the draft tube 6 resulting in performance deterioration.

Centrifugal force causes the running water to tend to flow toward the circumferential space in the vicinity of the tips 7 and the running water flowing at high velocity in the circumferential space causes the pressure on the suction surfaces, namely, the back surfaces, of the runner vanes 4 to drop. Consequently, cavitation is liable to occurs in a part including the gap between the runner vanes 4 and the discharge ring 8 causing cavitation erosion. Thus, the suppression of cavitation is important as well as the reduction of loss that cause performance degradation for the extension of the runner vanes 4. Known techniques relevant to the present invention are disclosed in Japanese Patent documents 1, 2 and 3 as follows.

Patent document 1: JP-A H3-151570
Patent document 2: JP-A H7-54752
Patent Document 3: JP-A 2005-315216

SUMMARY OF THE INVENTION

An axial-flow hydraulic turbine mentioned in Patent document 1 has runner vanes each provided with a fillet at the tip thereof to suppress the deterioration of the performance of the hydraulic turbine by cavitation.

Although the occurrence of cavitation can be suppressed by providing each of the runner vanes with the fillet, the flow velocity distribution at the trailing edge of the runner vanes cannot be optimized. Further, welding fillets to the runner vanes requires an additional manufacturing process.

Accordingly, it is an object of the present invention to provide a runner vane for an axial-flow hydraulic machine, formed in an optimum shape that provides an effect similar to that of the runner vane provided with a fillet and capable of improving performance by optimizing flow velocity distribution at the trailing edge of the runner vane.

A runner vane in one aspect of the present invention for an axial-flow hydraulic machine is configured by:

obtaining a plurality of circumferential sections of the runner vane
by cutting the runner vane from a root to a tip of the runner vane with a plurality of coaxial cylindrical surfaces having centers on an axis of the runner, circumferentially dividing respective streamlines, indicating a front surface and a back surface of the runner vane in the respective circumferential sections of the runner vane, into parts of equal lengths from an leading edge and to a trailing edge of the runner vane, respectively, obtaining a plurality of radial sections of the runner vane extending from the root to the tip of the runner vane, by cutting the runner vane with radial surfaces respectively extending along lines connecting respective edge points of the parts of equal lengths in the respective streamlines in the circumferential sections of the runner vane, forming the front surface and the back surface of the runner vane such that a radius $\rho p$ of curvature of the front surface and a radius $\rho s$ of curvature of the back surface meet a condition expressed by the following inequality, $$\rho s < \rho p,$$

by forming a camber line of the respective radial sections of the runner vane so as to have a curved part thereof convex toward the front surface of the runner vane near the tip of the runner vane.

The present invention provides a runner vane for an axial flow hydraulic machine capable of providing an effect similar to that of the fillet by optimizing the shape of the runner vane, and of improving performance by optimizing the flow velocity distribution at the trailing edge of the runner vane.

DESCRIPTION OF THE PREFERRED EMBODIMENTS

Runner vanes in preferred embodiments of the present invention for an axial-flow hydraulic machine will be described with reference to FIGS. 1 to 13, in which like parts are designated by the same reference characters and the duplicate description thereof will be omitted.

First Embodiment

A runner vane 10 in a first embodiment according to the present invention will be described with reference to FIGS. 1 to 6.

Figure 1:
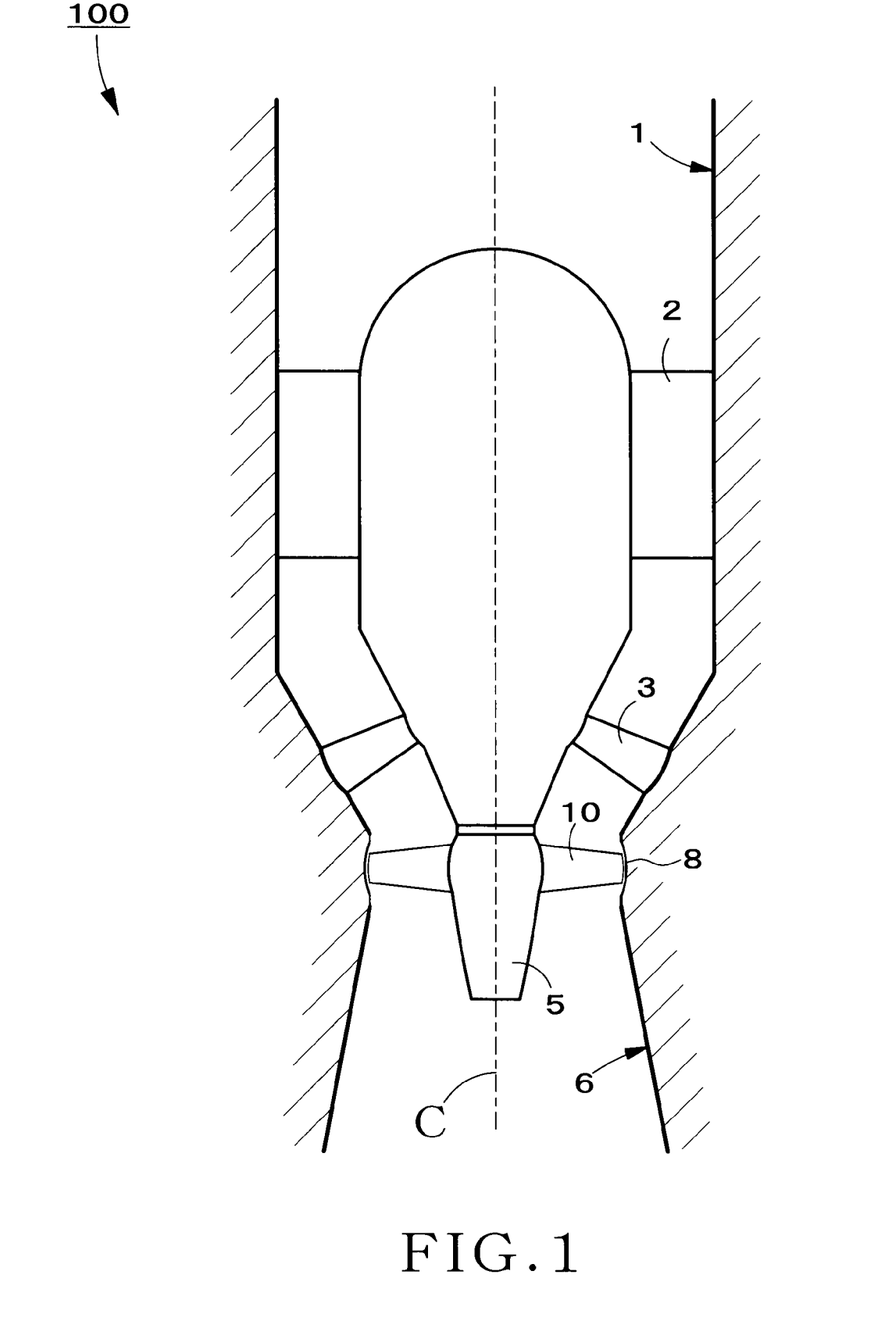
FIG. 1 is a fragmental sectional view of an axial-flow hydraulic machine provided with runner vanes in a first embodiment according to the present invention.

An axial-flow hydraulic machine 100 shown in FIG. 1 is the same in construction as a conventional axial-flow hydraulic machine shown in FIG. 14, except that the axial-flow hydraulic machine 100 is provided with the runner vanes 10 in the first embodiment.

Figure 2:
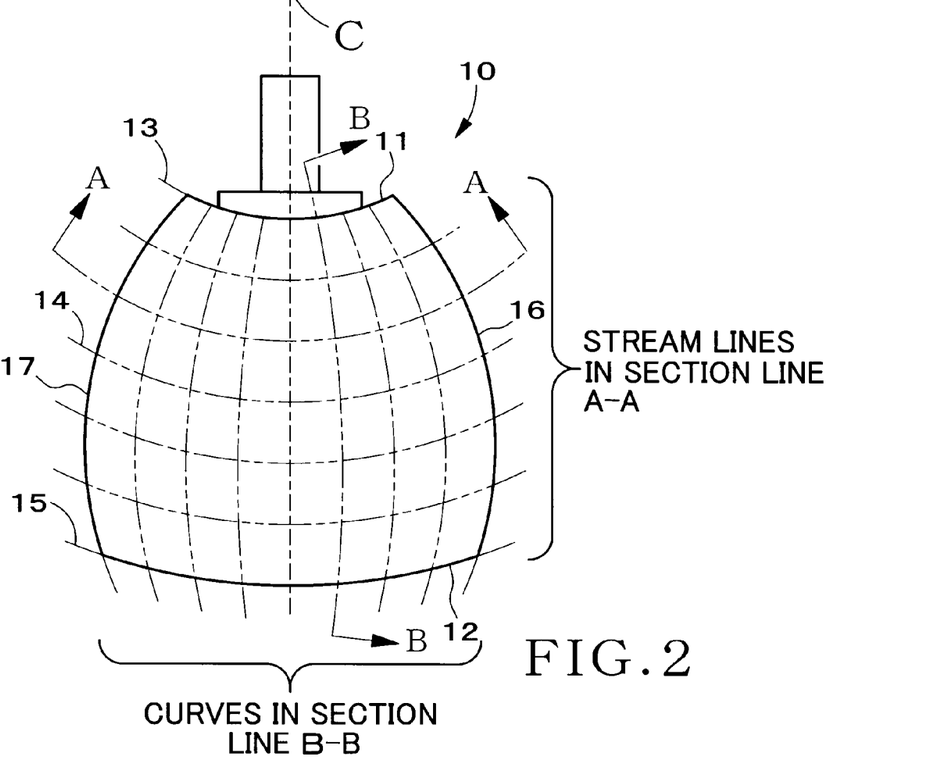
FIG. 2 is a diagrammatic view of assistance in explaining the shape of the runner vane in the first embodiment.
Figure 3:
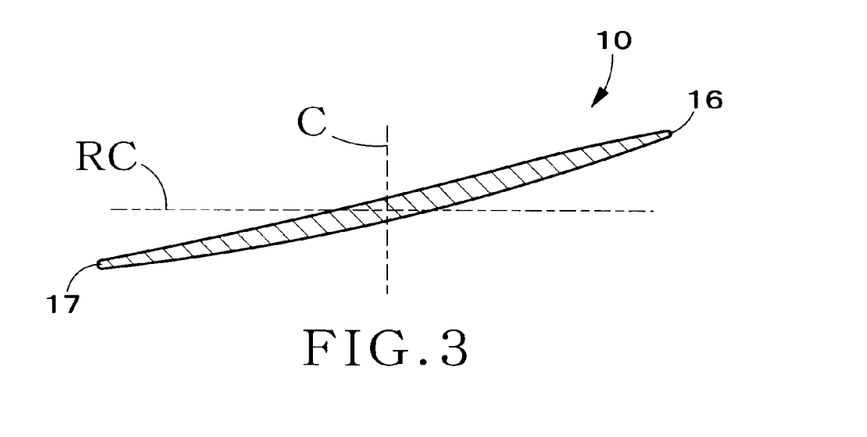
FIG. 3 is a sectional view taken on the line A-A in FIG. 2.

A plurality of circumferential sections, namely, an A-A sections, as shown in FIG. 3 are obtained by cutting parts arranged from the root 11 of the runner vane 10 on a boss to the tip 12 of the runner vane 10 by a plurality of cylindrical surfaces spaced apart at equal intervals and having centers on the axis C of the runner as shown in FIG. 2.

Figure 4:
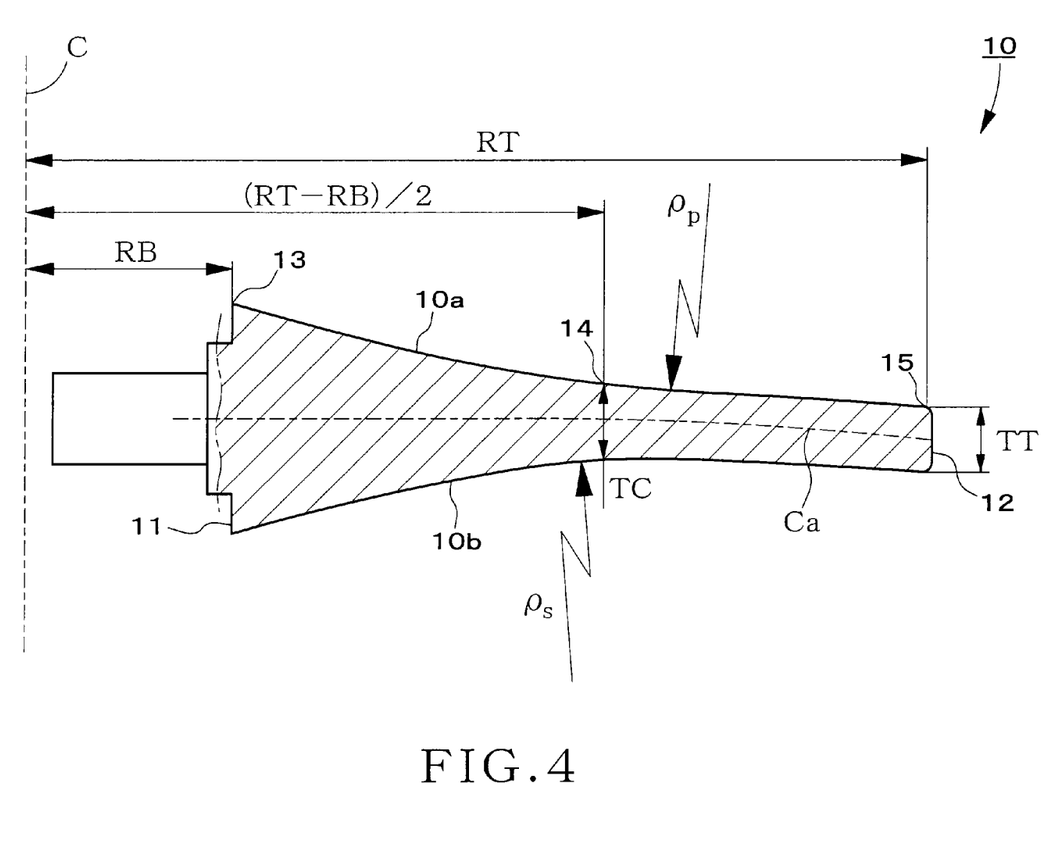
FIG. 4 is a sectional view taken on the line B-B in FIG. 2.

Curves forming the front surface 10a and the back surface 10b of the runner vane 10 in those circumferential sections as shown in FIG. 4 will be called streamlines of the A-A section.

Streamlines indicated at 13, 14 and 15 will be called a root stream line, a middle streamline and a tip stream line, respectively.

Referring to FIG. 2, each of the streamlines extending between the leading edge 16 and the trailing edge 17 of the runner vane 10 is divided circumferentially into parts of equal length. The runner vane 10 is cut with radial sections, namely, a B-B section, as shown in FIG. 4, respectively extending along lines connecting respective edge points of the parts of equal lengths in the respective streamlines in the circumferential sections of the runner vane, to obtain a radial section, As shown in the radial section shown in FIG. 4, a part of the camber line Ca near the tip 12 is curved so as to be convex toward the front surface 10a of the runner vane 10.

The front surface 10a and the back surface 10b of the runner vane 10 are formed such that the radius $\rho p$ of curvature of the surface 10a obtained by connecting a root streamline 13, a middle streamline 14 and a tip stream line 15, and the radius $\rho s$ of curvature of the back surface 10b meet Expression (1)

$$\rho p < \rho p \tag{1}$$

Figure 5:
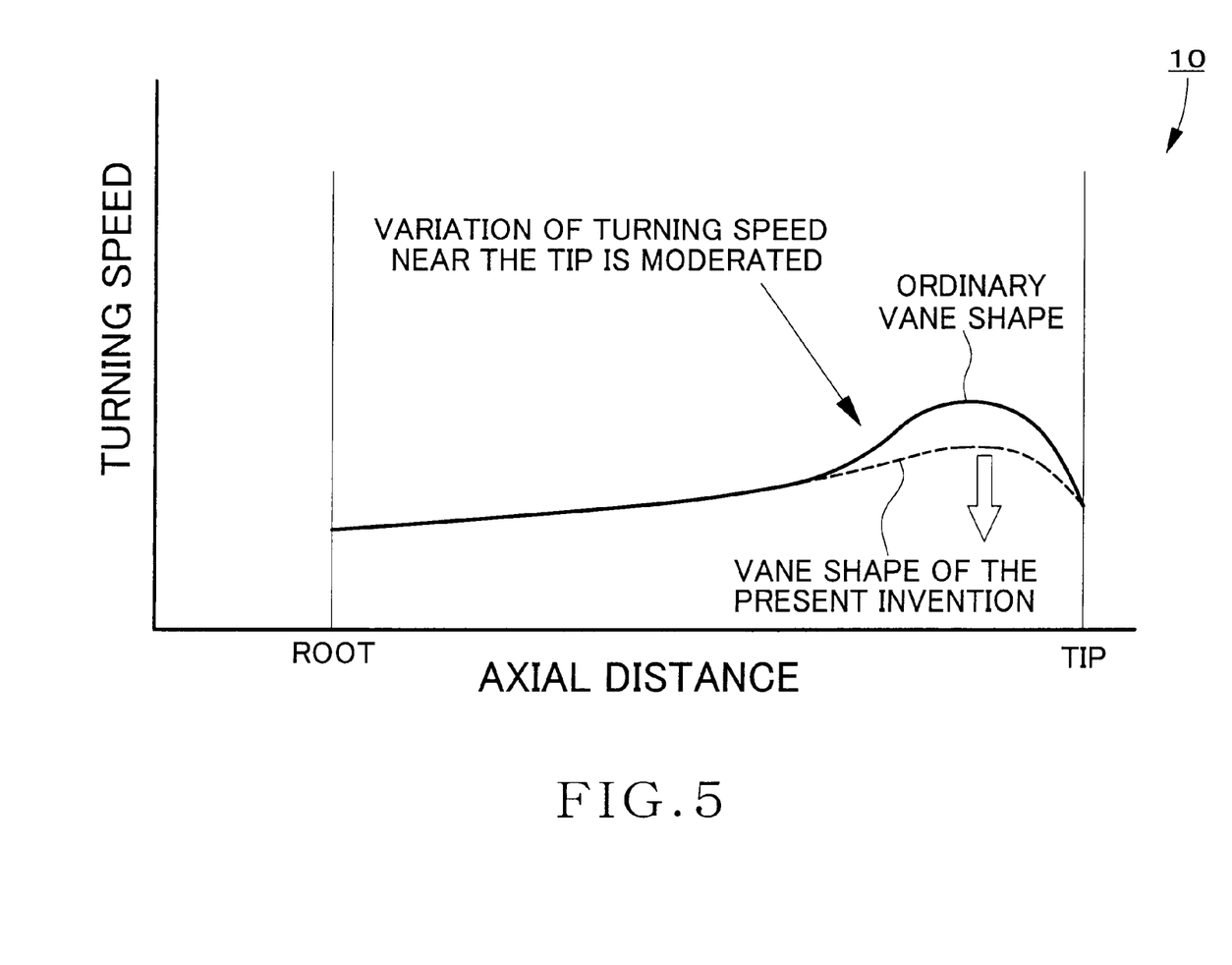
FIG. 5 is a graph of assistance in explaining the effects of the runner vane in the first embodiment.

In an ordinary vane 4 shown in FIG. 15, velocity components in a turning direction in a flow velocity distribution at the trailing edge of the runner vane form a flow velocity distribution is caused to tend toward the tip by a leakage flow in the vicinity of the tip, through flow and centrifugal force as shown in FIG. 5.

In the runner vane 10 in the first embodiment, a tip part 12 of the back surface 10b is curved so as to be convex toward the front surface 10a of the runner vane 10 from the root 11 toward the tip 12 as shown in FIG. 5.

Thus, flow toward the tip 12 is suppressed and hence the variation of the velocity in the turning direction is more gradual than that around the conventional rotor vane.

Consequently, loss can be reduced because pressure recovery in the draft tube 6 is not impeded.

Figure 6:
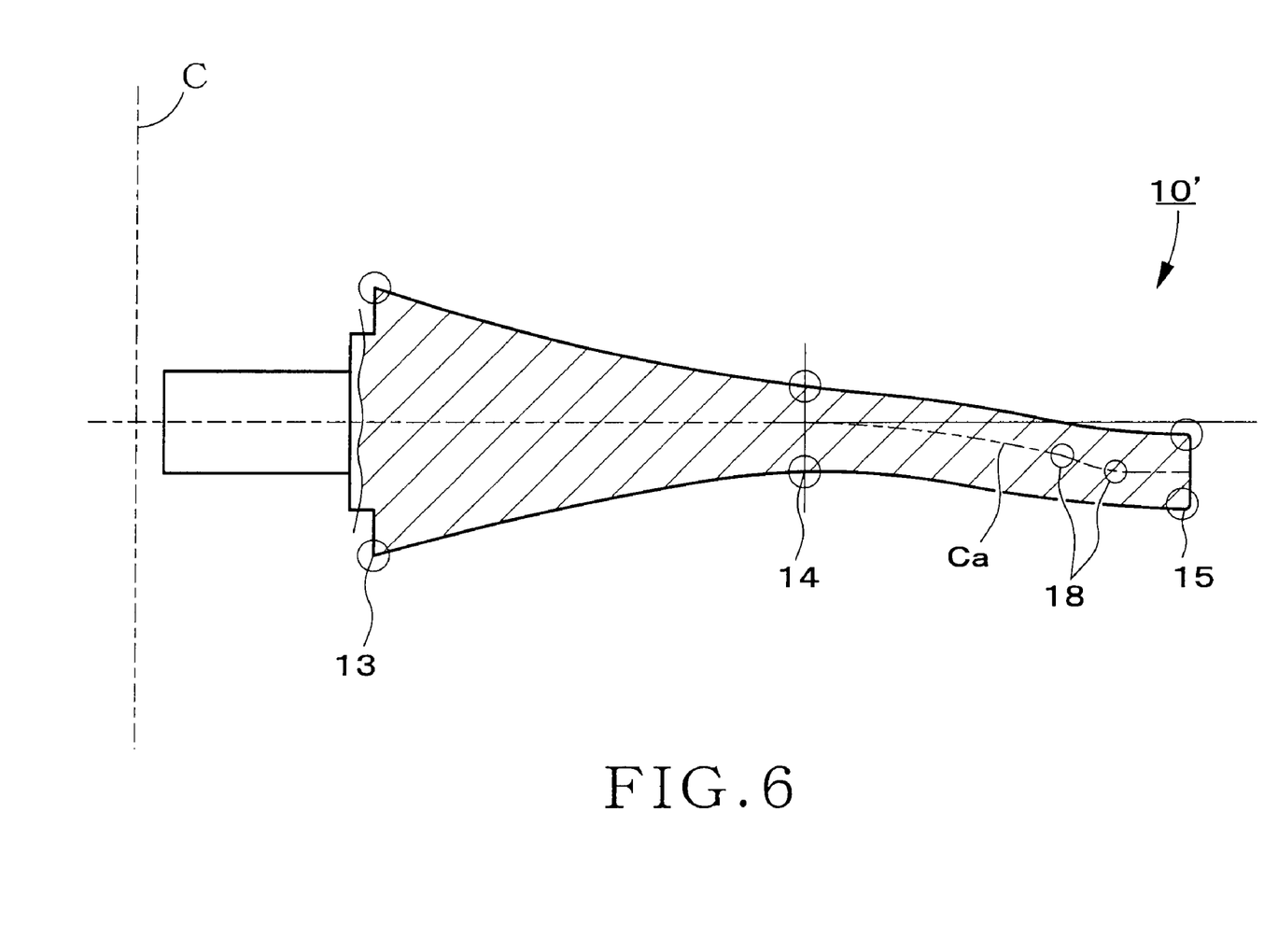
FIG. 6 is a sectional view of a runner vane in a modification of the first embodiment.

A runner vane 10' in a modification shown in FIG. 6 may have inflection points 18 in a part of the camber line Ca between a middle streamline 14 and a tip streamline 15. The effect of runner vane 10' is similar to that of the runner vane 10.

Second Embodiment

A runner vane 20 in a second embodiment according to the present invention will be described with reference to FIGS. 7 and 8.

Figure 7:
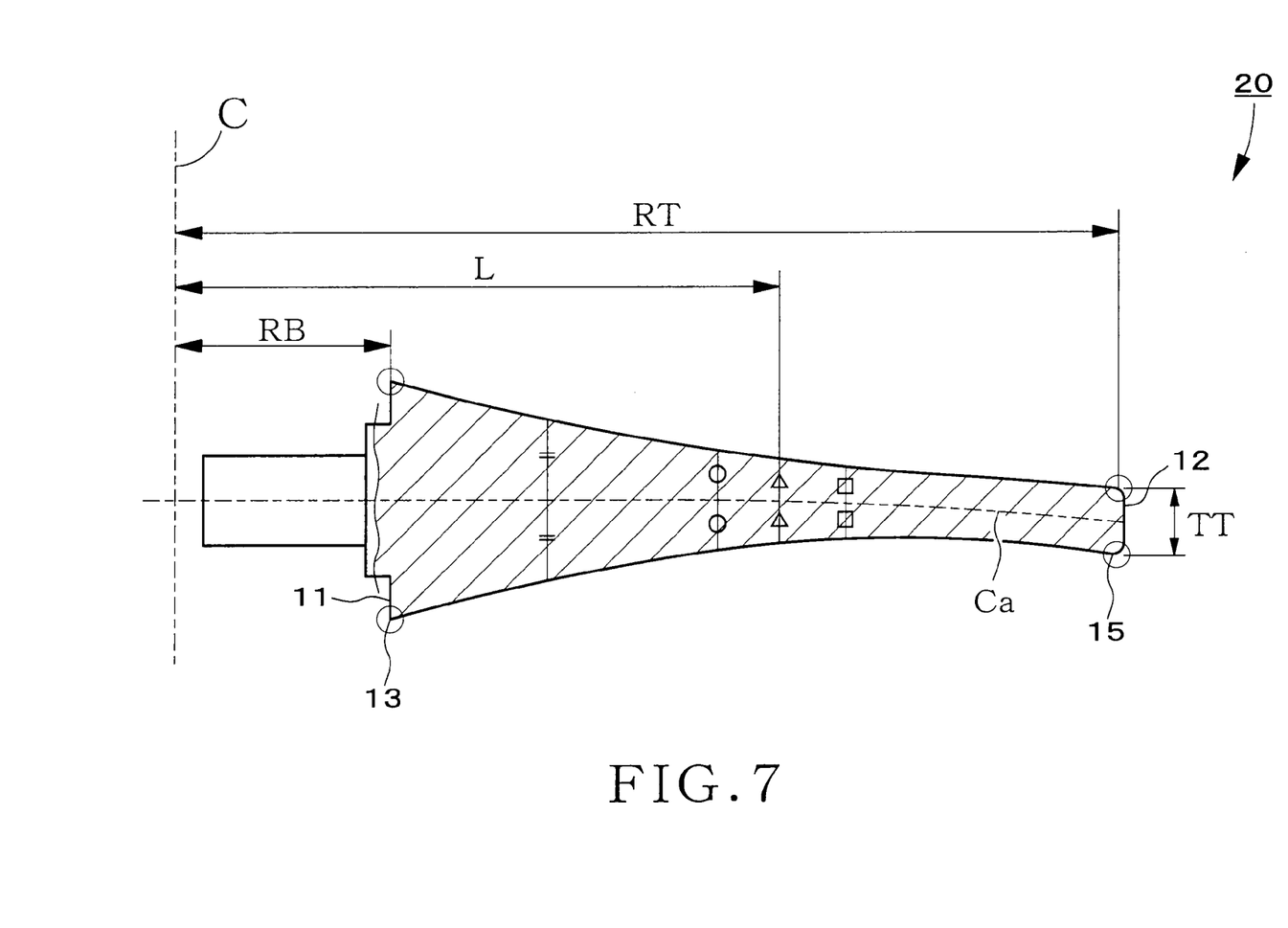
FIG. 7 is a sectional view of a runner vane in a second embodiment according to the present invention.
Figure 8:
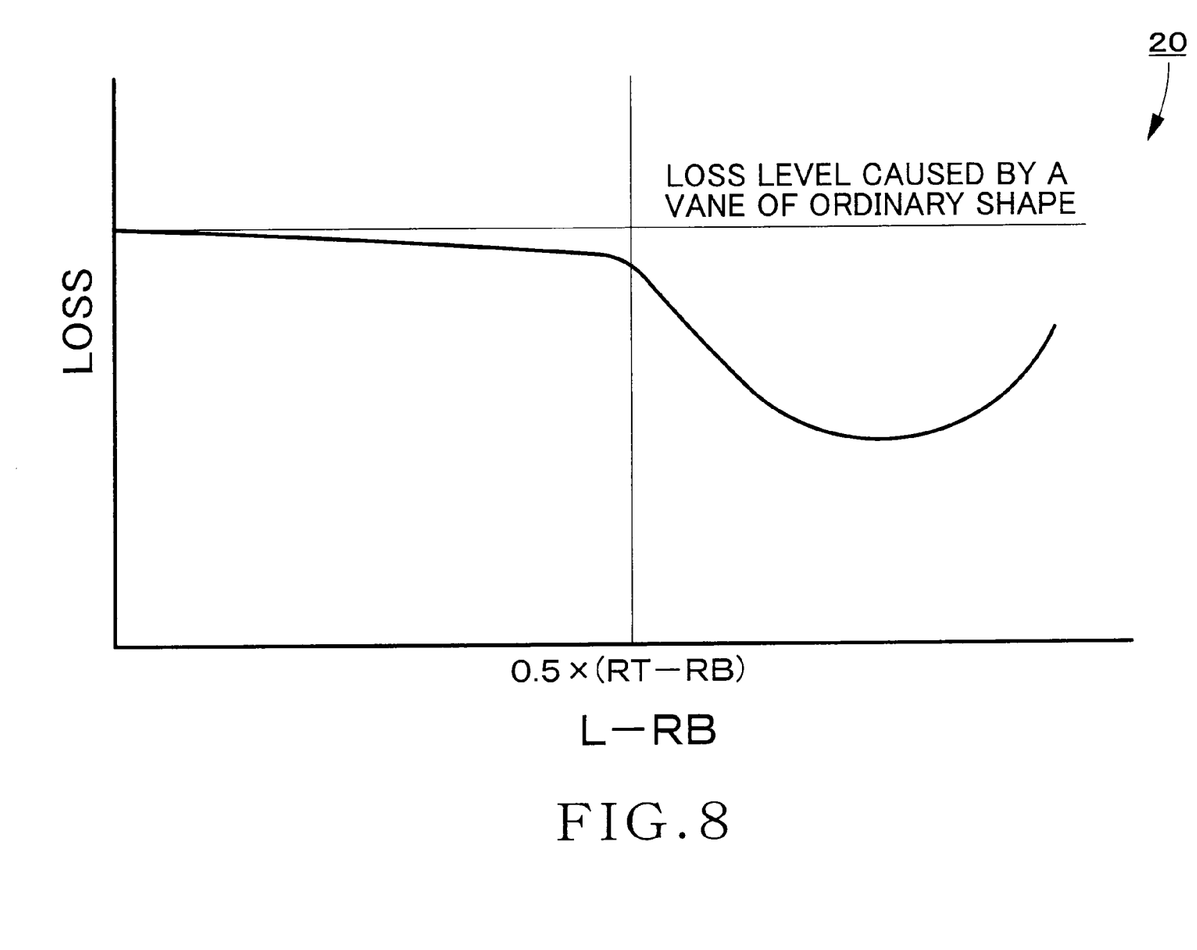
FIG. 8 is a graph of assistance in explaining the effects of the runner vane in the second embodiment.

The runner vane 20 in the second embodiment shown in FIG. 7 is formed by forming the runner vane 10 in the first embodiment such that a radial distance RB from the axis C of the runner to the root 11, a radial distance RT from the axis C of the runner to the tip 12 and a radial distance L from the axis C of the runner to a curved part convex toward the surface of the runner vane of the camber line Ca in the runner vane 10 in the first embodiment meet Expression (2).

$$L - RB \geq = 0.5 \times (RT - RB) \tag{2}$$

Disturbance of a flow velocity distribution is liable to occur in a range between the radially middle part and the tip of the runner vane 10.

A radial range specified by Expression (2) in the runner vane 20 in the second embodiment has the shape described in connection with the runner vane 10 in the first embodiment. Therefore, the runner vane 20 can optimize the flow velocity distribution and can reduce loss as shown in FIG. 8.

Third Embodiment

A runner vane 30 in a third embodiment according to the present invention will be described with reference to FIGS. 9 and 10.

Figure 9:
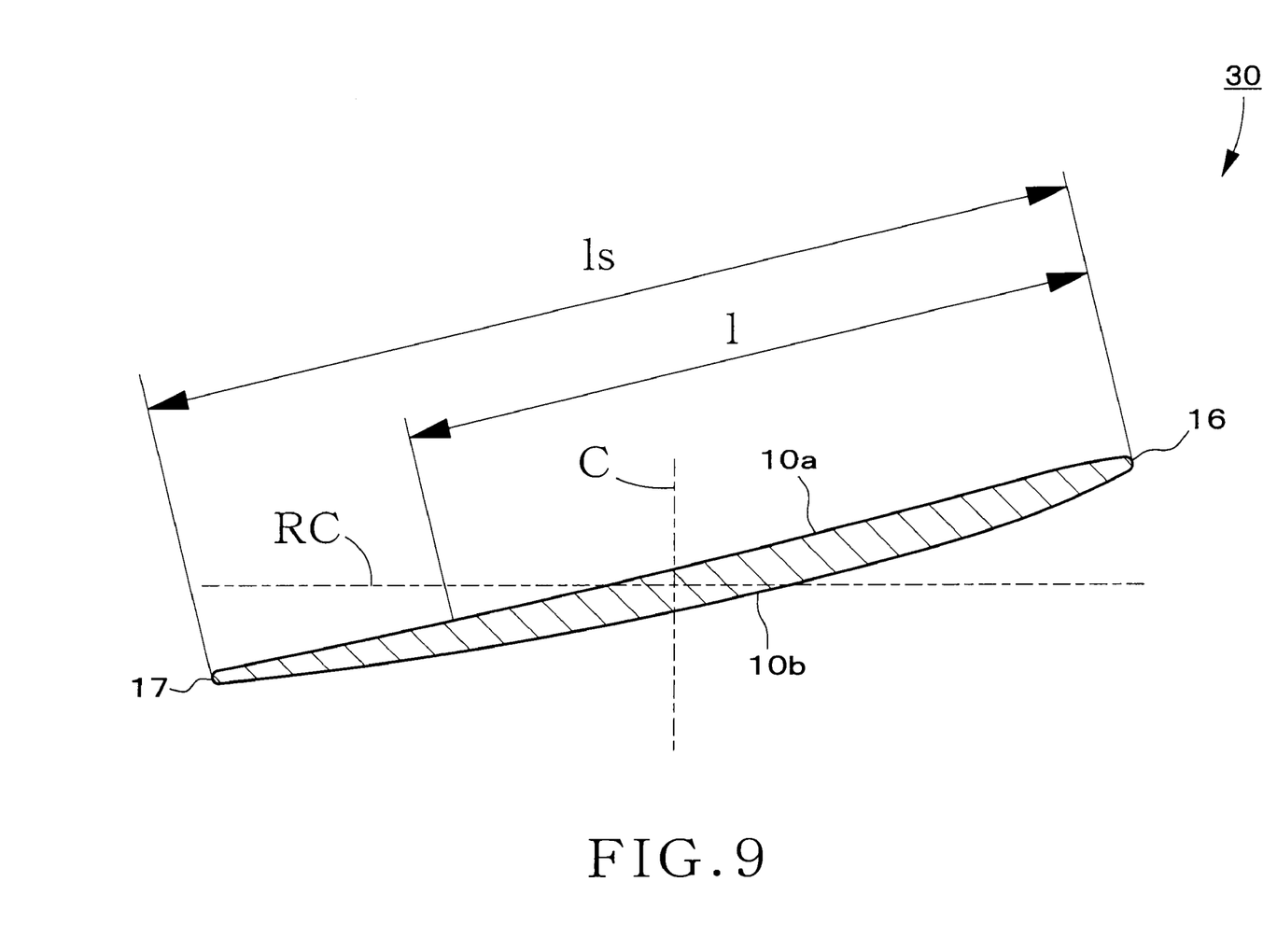
FIG. 9 is a sectional view of a runner vane in a third embodiment according to the present invention.

FIG. 9 is a sectional view of the runner vane 3 in the third embodiment taken along the streamline of the A-A section in FIG. 2.

The runner vane 30 in the third embodiment is formed such that the distance I from the leading edge 16 of the runner vane 30 to a curved part convex toward the front surface 10a of the camber line Ca as mentioned in connection with the runner vane 10 in the first embodiment and the length Is of a circumferential streamline extending from the leading edge 16 to the trailing edge 17 of the runner vane 30 meet Expression (3)

$$I = < 0.8 \times Is \tag{3}$$

Figure 10:
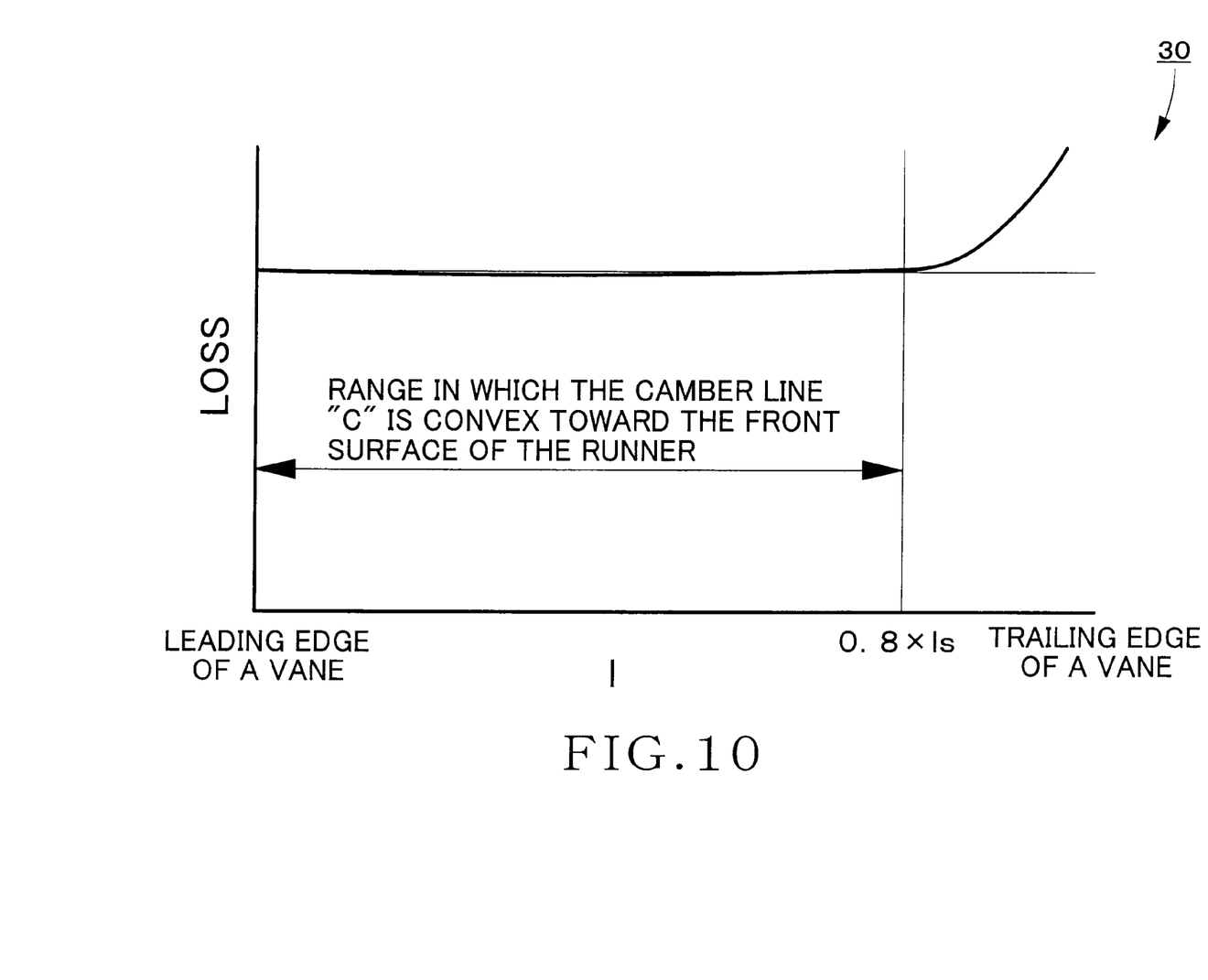
FIG. 10 is a graph of assistance in explaining the effects of the runner vane in the third embodiment.

In the runner vane 10 in the first embodiment, when the range of a curved part curved so as to be convex toward the front surface 10a of the runner vane 10 of the camber line Ca range between the leading edge 16 and the trailing edge 17 of the runner vane 10, loss increases as shown in FIG. 10, due to a large wake flow that occurs downstream from the trailing edge 17 of the runner vane.

As mentioned above in connection with the runner vane 10 in the first embodiment, the runner vane 30 in the third embodiment is formed such that the part of the camber line Ca curved so as to be convex toward the front surface 10a extends in the circumferential range meeting Expression (3). Therefore, loss resulting from the occurrence of a wake flow can be reduced.

Fourth Embodiment

A runner vane 40 in a fourth embodiment according to the present invention will be described with reference to FIG. 11.

The runner vane 40 in the fourth embodiment is formed such that the thickness TC of a part of the runner vane corresponding to the middle streamline 14 and the thickness TT of the tip 12 of the runner vane 10 in the first embodiment meet Expression (4).

$$1.2TC =< TT =< 1.6TC \quad (4)$$

Figure 11:
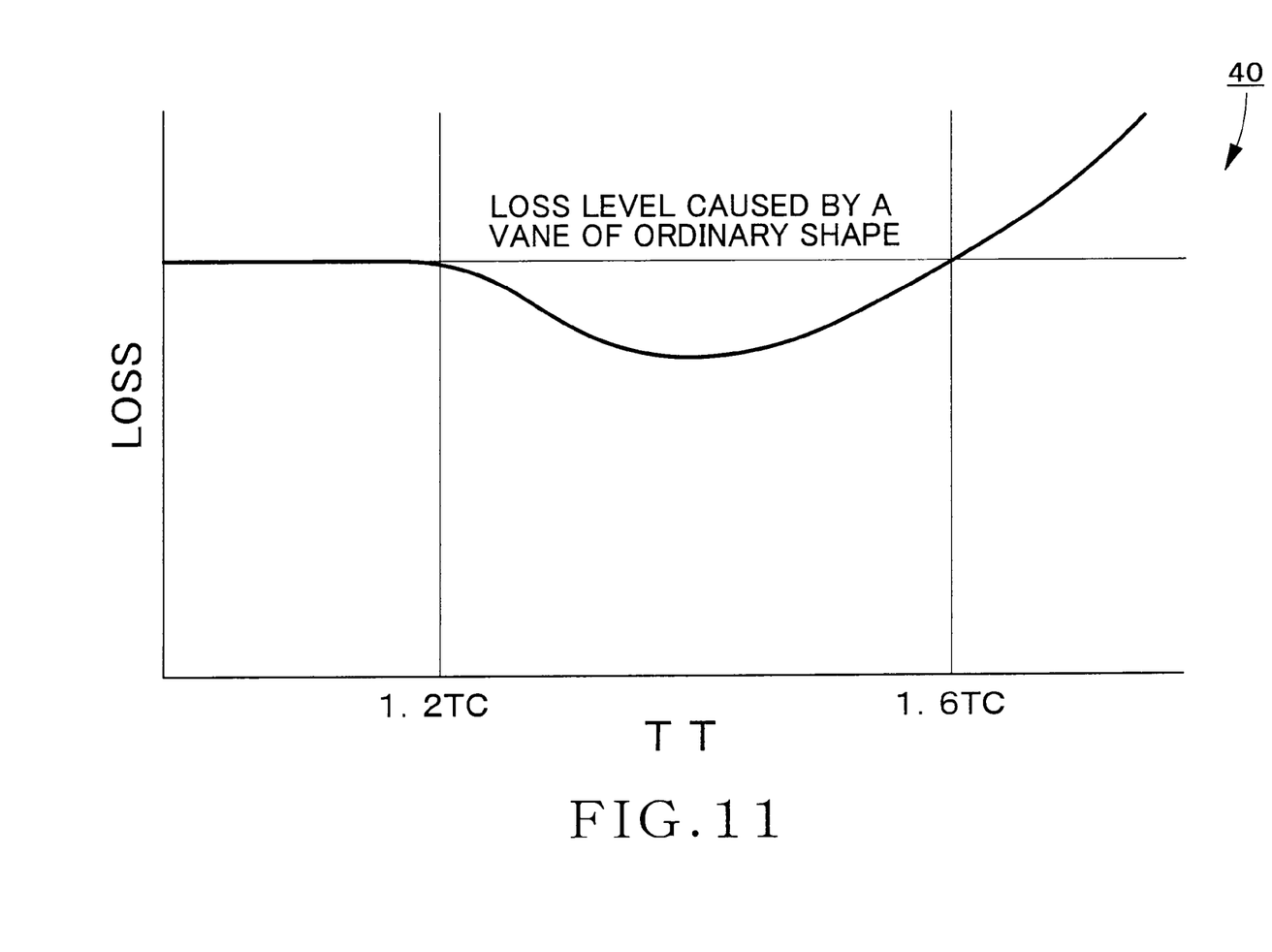
FIG. 11 is a graph of assistance in explaining the effects of the runner vane in a fourth embodiment according to the present invention.

As shown in FIG. 11, the runner vane 10 in the first embodiment is effective when 1.2TC=<TT. Impact loss increases, blade load distribution becomes improper and loss increases if 1.6TC=<TT.

Since the thickness TT of the tip 12 of the runner vane 40 in the fourth embodiment is within the range defined by Expression (4), flow along the back surface of the runner vane 40 toward the tip is suppressed and the variation of velocity with respect to the turning direction is more gradual than that in the conventional runner vane.

Therefore, pressure recovery in the draft tube 6 is not impeded and hence loss can be reduced.

Fifth Embodiment

Figure 12:
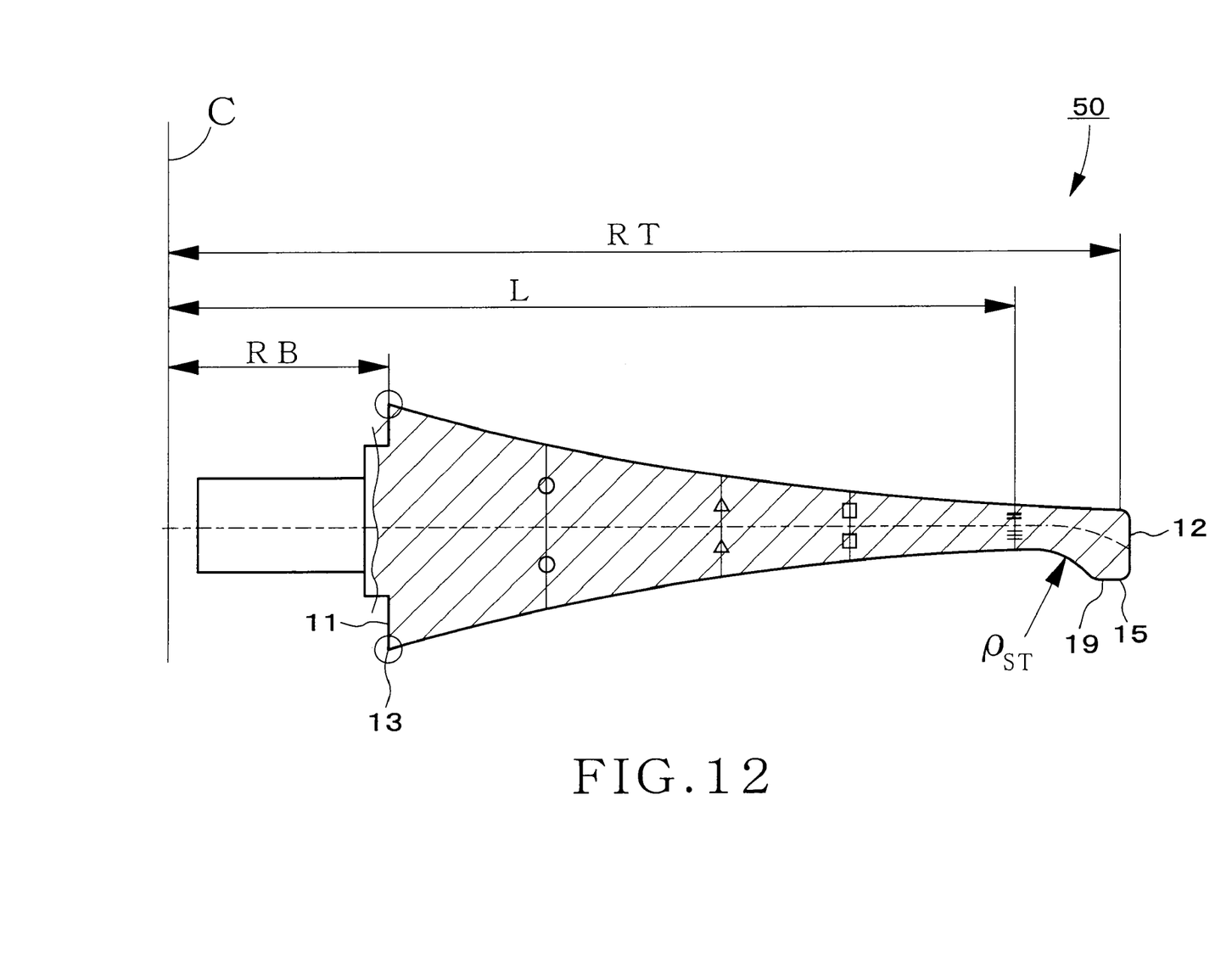
FIG. 12 is a sectional view of a runner vane in a fifth embodiment according to the present invention.

A runner vane 50 in a firth embodiment according to the present invention will be described with reference to FIGS. 12 and 13.

The runner vane 50 in the fifth embodiment is formed such that the radius $\rho ST$ of curvature of a part of the runner vane 30 in the third embodiment extending from a position at a distance L from the axis of the runner meeting a condition expressed by Expression (5) from the axis C to a thickest tip part 19 meets a condition expressed by Expression (6).

$$L-RB >= 0.8 \times (RT-RB) \quad (5)$$

$$0.5 =< (RT-L)/\rho ST < 1.0 \quad (6)$$

Although the occurrence of cavitation in the vicinity of the tip can be suppressed and leakage flow can be suppressed, shape of the vane is ineffective and flow velocity distribution at the trailing edge cannot be optimized when the radius $\rho ST$ of curvature in the runner vane 50 in the fifth embodiment does not meet the condition expressed by Expression (6).

Figure 13:
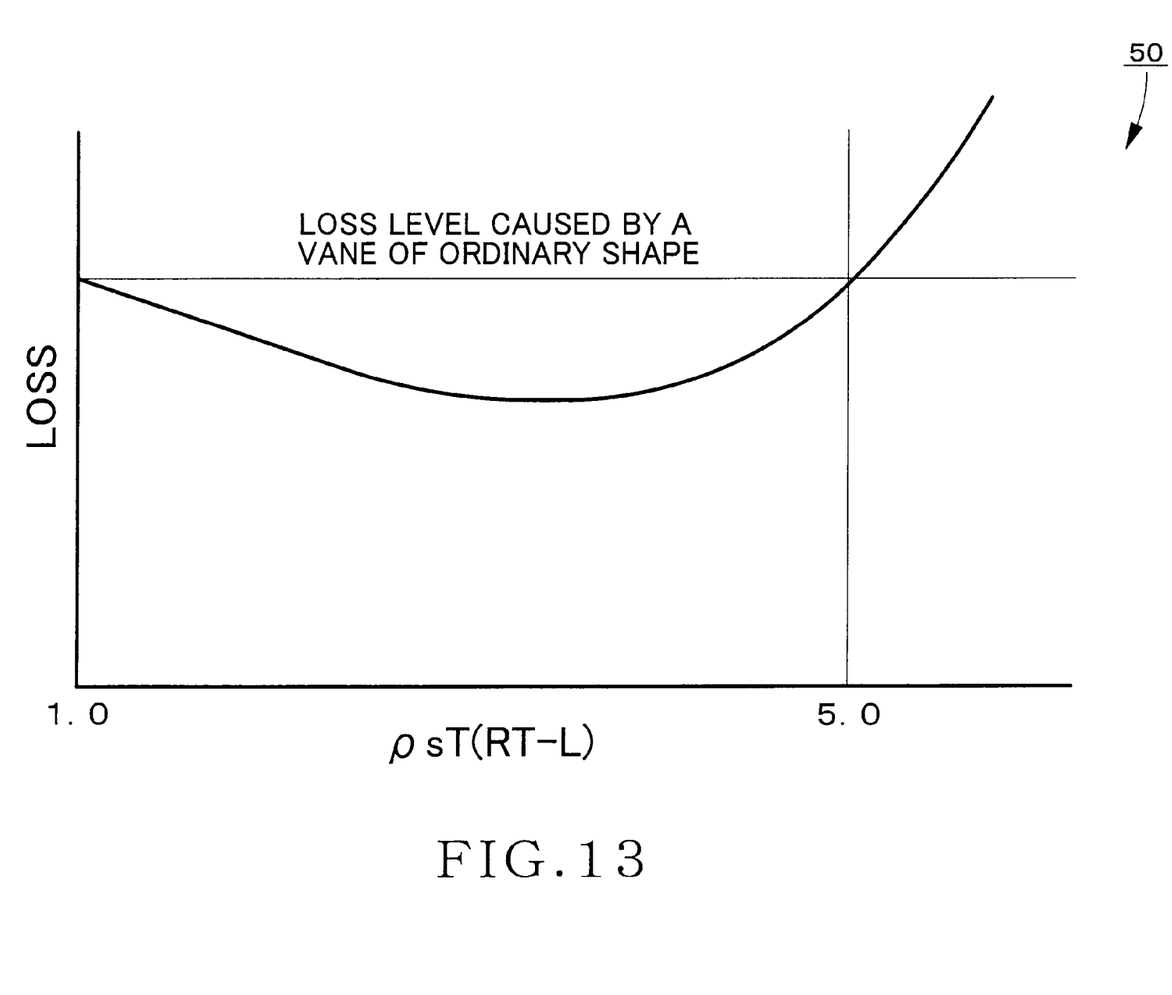
FIG. 13 is a graph of assistance in explaining the effects of the runner vane in the fifth embodiment.

As obvious from FIG. 13, the present invention exercises a satisfactory effect when the condition expressed by Expression (6) is satisfied.

What is claimed is:

1. A runner vane having no fillet at a tip in a back surface thereof in an axial-flow hydraulic machine configured by:
    obtaining a plurality of circumferential sections of the runner vane by cutting the runner vane from a root to the tip of the runner vane with a plurality of coaxial cylindrical surfaces having centers on an axis of the runner,
    circumferentially dividing respective streamlines, indicating a front surface and the back surface of the runner vane in the respective circumferential sections of the runner vane, into parts of equal lengths from an leading edge and to a trailing edge of the runner vane, respectively,
    obtaining a plurality of radial sections of the runner vane extending from the root to the tip of the runner vane, by cutting the runner vane with radial sections respectively extending along lines connecting respective edge points of the parts of equal lengths in the respective streamlines in the circumferential sections of the runner vane,
    forming the front surface and the back surface of the runner vane such that a radius $\rho p$ of curvature of the front surface and a radius $\rho s$ of curvature of the back surface meet a condition expressed by the following inequality, $$\rho s < \rho p,$$

by forming a camber line of the respective radial sections of the runner vane so as to have a curved part thereof convex toward the front surface of the runner vane near the tip of the runner vane.

2. The runner vane for an axial-flow hydraulic machine, according to claim 1, wherein the camber line has inflection points in a part thereof between a radially middle point of the runner vane and the tip of the runner vane.

3. The runner vane for an axial-flow hydraulic machine, according to claim 1, wherein the camber line is formed such that the curved part thereof convex toward the surface of the runner vane exists in a range "L" meeting a condition expressed by the following inequality, $$L-RB >= 0.5 \times (RT-RB),$$

in which "RB" is a radial distance from the axis "C" of the runner to the root of the boss, "RT" is a radial distance from the axis "C" of the runner to the tip, and "L" is a radial distance from the axis "C" of the curved part of the camber line.

4. The runner vane for an axial-flow hydraulic machine, according to claim 1, wherein the camber line is formed such that the curved part thereof convex toward the front surface of the of the runner vane exists in a range "1" meeting a condition expressed by the following inequality, $$l =< 0.8 \times ls,$$

in which "ls" is a length of the respective streamlines extending from the leading edge to the trailing edge of the runner vane, and "l" is a circumferential distance from a leading edge of the runner vane to the curved part of the camber line.

5. The runner vane for an axial-flow hydraulic machine, according to claim 1, wherein thickness "TC" of a radially middle part of the runner vane and thickness "TT" of the tip of the runner vane meet a condition expressed by the following inequality.

$$1.2TC =< TT =< 1.6TC$$

6. The runner vane for an axial-flow hydraulic machine, according to claim 1, wherein the camber line is formed such that the curved part thereof convex toward the front surface of the runner vane exists in a range "L" meeting a condition expressed by the following inequality, $$L-RB >= 0.8 \times (RT-RB)$$

in which "RB" is a radial distance from the axis of the runner to the root, "RT" is a radial distance from the axis of the runner to the tip, and "L" is a radial distance from the axis of the runner to the curved part of the camber line,
    and wherein a radius $\rho ST$ of curvature of a part of the runner vane from a position at the radial distance "L" from the axis of the runner to a thickest tip part meets a condition expressed by the following expression $$0.5 =< (RT - L)/\rho ST < 1.0.$$

* * * * *